United States Patent
Ishizuka

(10) Patent No.: US 7,317,548 B2
(45) Date of Patent: Jan. 8, 2008

(54) IMAGE PROCESSING DEVICE

(75) Inventor: Junichi Ishizuka, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 1065 days.

(21) Appl. No.: 10/212,697

(22) Filed: Aug. 7, 2002

(65) Prior Publication Data

US 2003/0030650 A1    Feb. 13, 2003

(30) Foreign Application Priority Data

Aug. 7, 2001    (JP) .............................. 2001-238976

(51) Int. Cl.
*G06F 3/12* (2006.01)
*G06K 15/00* (2006.01)
(52) U.S. Cl. .................... 358/1.15; 358/1.16; 358/1.18
(58) Field of Classification Search ............... 358/1.15, 358/1.16, 1.17, 1.13, 1.14, 1.18, 1.1, 1.2, 358/1.6, 1.9, 1.11, 404, 444, 468, 452, 537; 345/173, 174, 175, 176, 177, 178; 715/835, 715/836, 837, 527, 526

See application file for complete search history.

(56) References Cited

U.S. PATENT DOCUMENTS 5,926,561 A * 7/1999 Utagawa ..................... 382/166

* cited by examiner

*Primary Examiner*—Dov Popovici
(74) *Attorney, Agent, or Firm*—Oblon, Spivak, McClelland, Maier & Neustadt, P.C.

(57) ABSTRACT

An image processing device according to the present invention has; a scanner which reads an original document, an image processor which takes in the read document image as digital information and processes and edits the data, an operation unit which combines and sets a plurality of image edit functions with respect to the document image, a bitmap data memory for displaying the edit picture image, and a display unit which displays the picture image set by combining the image edit functions on the operation panel, before starting copying.

5 Claims, 7 Drawing Sheets

FIG.8

■ STAMP PRINTING

PLEASE SELECT TYPE OF PRINTING, POSITION AND DIRECTION, AND PAGE, AND WHEN SELECTION IS FINISHED, PLEASE CLOSE WINDOW.

| CONFI-DENTIAL | COLLECTED | STRICTLY PROHIBIT COPYING | URGENT |
|---|---|---|---|
| PRO-VISIONAL | CIRCULA-TION | confidential | |

<POSITION/DIRECTION>          <PRINTING PAGE>

| CHANGE | | ALL PAGES | ONLY THE TOP PAGE |

| CANCEL AND CLOSE | | SET AND CLOSE |

FIG.9

■ STAMP PRINTING

PLEASE SPECIFY POSITION OF STAMP, AND WHEN IT IS FINISHED, PLEASE CLOSE WINDOW.

| ① | ② | ③ |
|---|---|---|
| ④ | ⑤ | ⑥ |
| ⑦ | ⑧ | ⑨ |

| CANCEL AND CLOSE | | SET AND CLOSE |

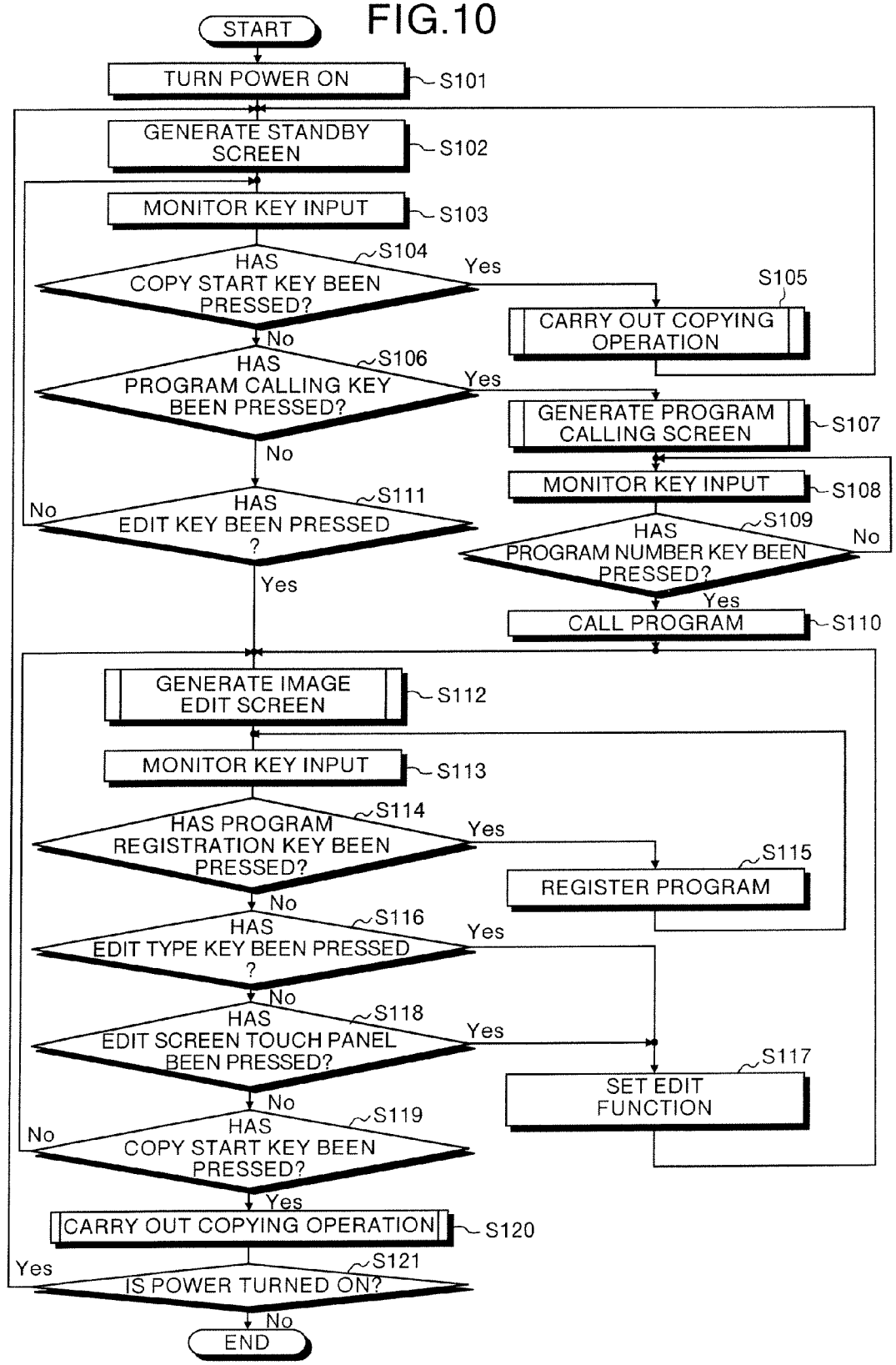

IMAGE PROCESSING DEVICE

BACKGROUND OF THE INVENTION

1. Field of the Invention

The present invention relates to an image processing device, and more specifically, relates to an image processing device having various image edit functions.

2. Description of the Related Art

Recently, digital copying machines have multi-functions in image editing, and there have been developed copying machines having various image edit functions, such as image transformation and color conversion by changing a variable power, or a combination function for adding characters and figures, shifting an image transfer position, or overlapping another image.

On the other hand, certain knowledge relating to image edit is required in order to use these edit functions. A finishing image can be imaged by referring to a manual or the like. However, when an image is copied by combining various image edit functions, for example, there may be such an instance that it is intended to combine "image inversion" and "stamp printing", and to invert the stamp printing character, but when the image is actually copied and output, the stamp printing character has not been inverted, and hence the imaged picture is different from the actually output image.

Therefore, an operator has to reset the image edit functions again, output the image on a copy paper, and check the output result. If the output image is different from the imaged picture, this operation must be repeated again, thereby the workload increases, and the copy paper is wasted.

There has been proposed a conventional art which can confirm the final image on a display, after editing the read original document and before printing it on a sheet of paper. However, since it is necessary to display the read document on an operation panel, a memory which temporarily stores the image information and an image processor which develops the image information to a bitmap are necessary, thereby causing a cost increase of the apparatus itself.

Recently, the mounting rate of an ADF (Auto Document Feeder) is increasing, making it possible to handle a large amount of document by one operation. In the conventional art, however, after paper feed has been started from the ADF and the document has been read, paper feed is interrupted in order to confirm the finishing image and edit the image. Therefore, the operation for starting the paper feed is required again, and when the edit function is changed, the fed paper has to be removed in order to read the document again and to be set in the ADF again. Thus, there is a problem in that the workload of the operator is increased.

As the number of image edit functions increases, the operation procedure of the operator increases and becomes complicated, and when a plurality of image edit functions is to be set, it is necessary to finish a setting screen with respect to one setting, and then reenter the setting screen for another setting. Hence, there is a problem in that operation of the operator takes time and labor in order to complete all settings.

When the set content is different from the imaged picture, and the content of the site setting is to be changed, similarly many operations by the operator are required, and much labor is required until the operator can obtain an intended output image.

There is a function referred to as "program registration", by which the set function is registered in the memory, and the registered function can be called, using a registered number or simple name as a keyword. However, when there is a plurality of program registrations in which a plurality of image edit functions are set, it is difficult for a third person to judge which program registration is to be called. This is because the program registration is performed by registering a program by a number or a simple name, and since a picture of a finishing image cannot be obtained intuitively, it is hard to use for persons other than the person who has registered it.

SUMMARY OF THE INVENTION

It is an object of the present invention to provide an image processing device, which can completely finish setting of edit functions before starting image processing, which can reduce the number of copy errors and improve the work efficiency, and which can suppress a cost increase due to adding a memory or the like to the apparatus itself.

The image processing device according to the invention, comprises an image processing unit which takes in a document image as digital information and processes and edits the data, an operation unit which combines and sets a plurality of image edit functions with respect to the document image, a bitmap data memory which stores a plurality of edit images, and a display unit which reads out the picture image set by combining the image edit functions from the bitmap memory and displays the image, before outputting the image processing result.

These and other objects, features and advantages of the present invention are specifically set forth in or will become apparent from the following detailed descriptions of the invention when read in conjunction with the accompanying drawings.

BRIEF DESCRIPTION OF DRAWINGS

FIG. 8 is a diagram which shows a display example of the operation panel shown in FIG. 1;

FIG. 9 is a diagram which shows a display example of the operation panel shown in FIG. 1;

FIG. 10 is a flowchart which shows the control operation of the image processing device according to this embodiment;

DETAILED DESCRIPTIONS

Figure 1:
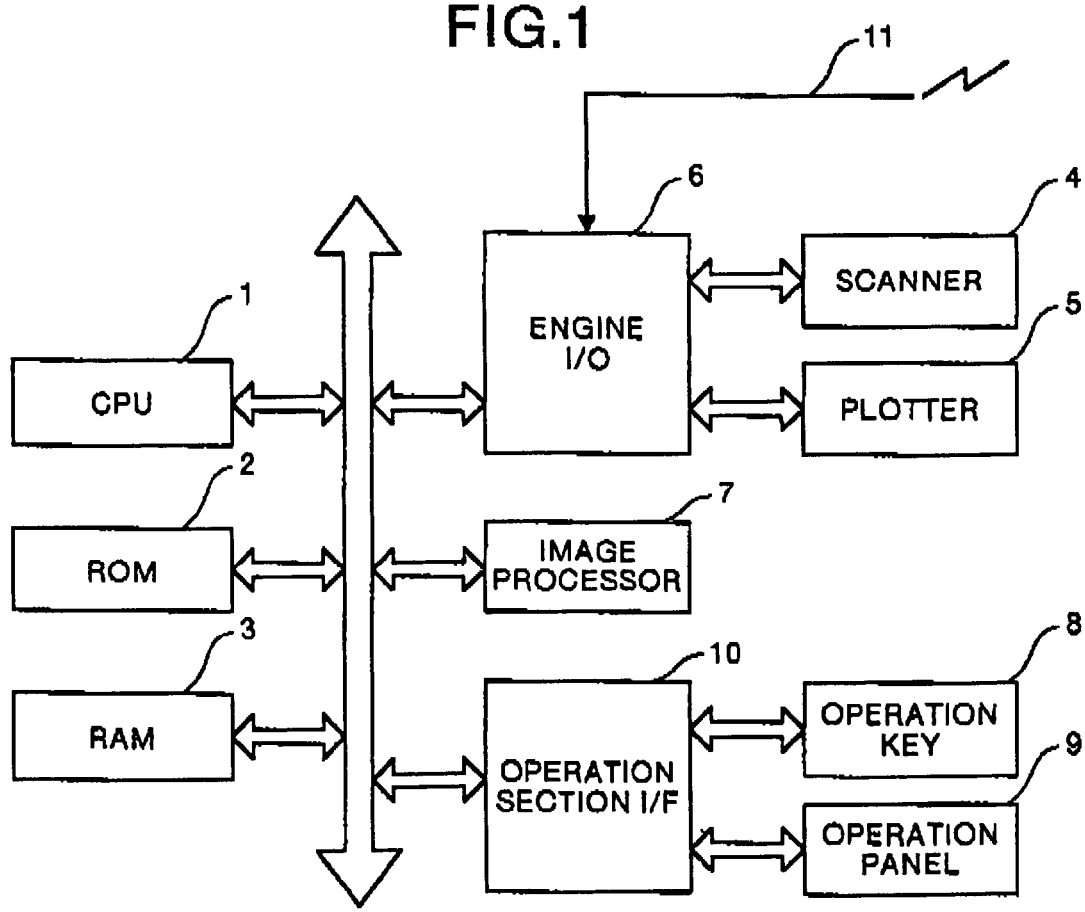
FIG. 1 is a block diagram which shows the configuration of an image processing device according to one embodiment of the present invention.

FIG. 1 is a block diagram which shows the configuration of the image processing device according to one embodiment of the present invention. In this figure, the image processing device in this embodiment has a CPU 1, a ROM 2, a RAM 3, a scanner 4, a plotter 5, an engine I/O 6, an image processor 7, an operation key 8, an operation panel 9 and an operation section I/F 10.

The CPU 1 performs logic operation of a control program stored in the ROM 2, and commands read and write of data with respect to the RAM 3.

The scanner 4 sends the digital information obtained by reading an original document in the horizontal scanning direction and in the vertical scanning direction by a unit of dot at a specified resolution, to the engine I/O 6.

The plotter 5 allows the toner to adhere on a photosensitive drum, allows the paper to be wound on the drum to thereby transfer the toner onto the paper, and lets the paper pass through a fixing roller to thereby fix the image thereon, and outputs the paper to an output tray.

The image information of the read document is edited in the image processor 7 via the engine I/O 6, to form the output image. Not only the image information read by the scanner 4 but also the image information via a network 11 are input to the engine I/O 6. In other words, in the image processing device according to the present invention, not only the information from the scanner 4 that is equipped in the machine but also the image information input by every possible method are processed.

The hardware information input by the operation key 8, or coordinate axis input information by means of a touch key displayed on the operation panel 9 is transmitted to the ROM 2 as the operation key input information by the operation section I/F 10.

In the ROM 2, an icon by a bitmap which builds up an image edit screen and character information are combined, and transferred to the operation panel 9 as display information via the operation section I/F 10.

Figure 2:
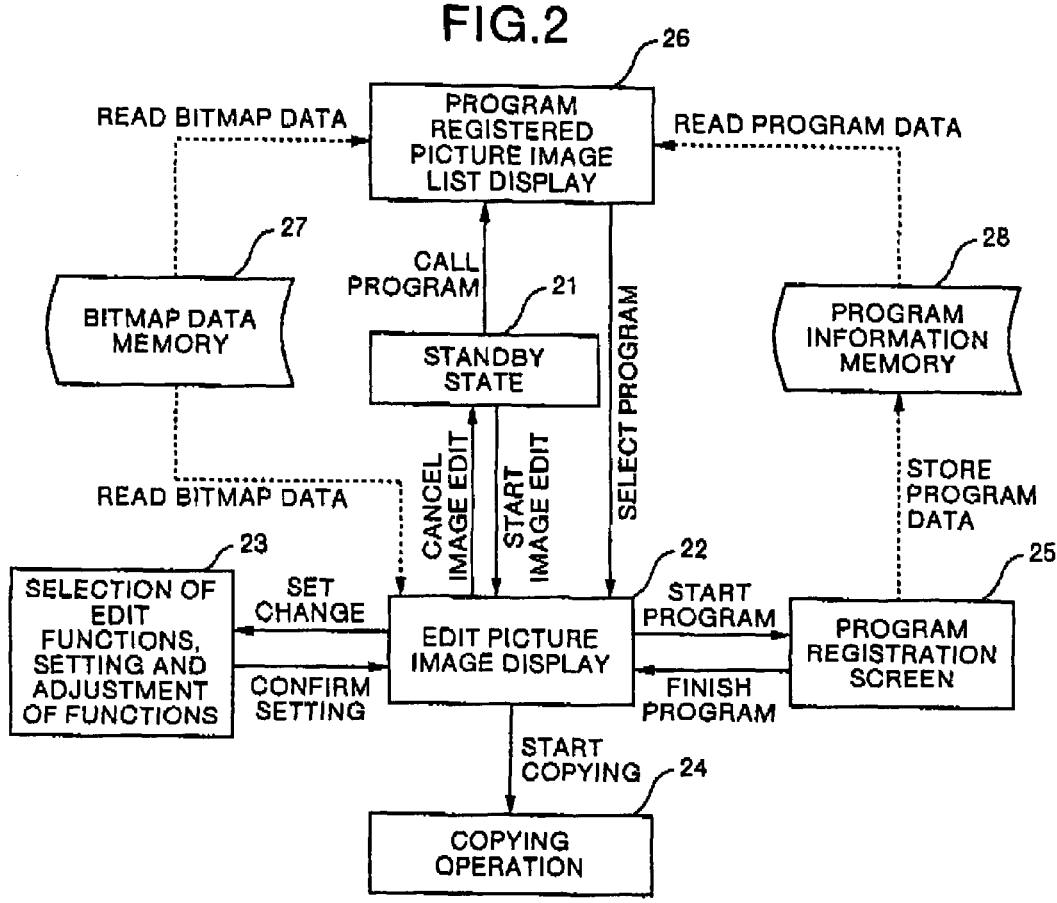
FIG. 2 is a diagram which shows the configuration of the operation process of the image processing device according to this embodiment.

FIG. 2 is a diagram which shows the configuration of the operation process of the image processing device according to this embodiment, which is constituted by processes such as a standby state 21, an edit picture image display 22, an edit function setting 23, copying operation 24, a program registration screen 25, and a program registered picture image list display 26.

The standby state 21 is a state that the whole apparatus does not operate, and it is assumed that all operations start from this process. When an image edit start is commanded by using the operation key or the like from this standby state 21, the edit picture image display 22 is displayed. If it is in a stage before performing image edit, a normal document display icon is displayed.

A display icon which builds up an edit picture image is stored in a bitmap data memory 27 as bitmap data, and when an address where the bitmap data is stored is specified, and coordinates on the operation panel are also specified, it is displayed on the operation panel as the icon data.

From the edit picture image display 22, by pressing an image edit item selection key, or touching an edit function reflected as the edit picture image display on the operation panel, the display shifts to the edit function setting 23.

When the image edit item selection key is pressed, a function is selected by a function selection process corresponding to the item, and the display shifts to an operation process in which setting of the selected function and the related adjustment are to be performed. However, when the edit picture image display is touched, the display directly shifts to the operation process in which setting of a function and the related adjustment are to be performed.

When the function selection and the related adjustment are finished, the display returns again to the edit picture image display 22. Here, icons required for image display are taken out from the bitmap data memory 27, according to the edit function set by the edit function setting 23, and respective icons are combined to display one image on the operation panel.

The operator confirms if the set contents agree with the imaged picture on the edit picture image display 22, and shifts to the copying operation 24 by the copy start operation.

When a program registration function is used, by which the set contents are stored when the edit function set by the edit picture image display 22 is to be used later, the display shifts to the program registration screen 25 in response to a program start command.

The program is registered by an optional number, and the registered information is stored in a program information memory 28. When this program-registered edit function is called, a program calling command is issued from the standby state 21, to thereby display a program-registered image list display 26. The edit setting information is read out from the program information memory 28, and the picture image built up by the bitmap data is displayed in a list for each program number.

The operator specifies a program by a program number or by an image icon, to select the program. After the selection, the display shifts to the edit picture image display 22 as in the normal image editing.

Figure 3:
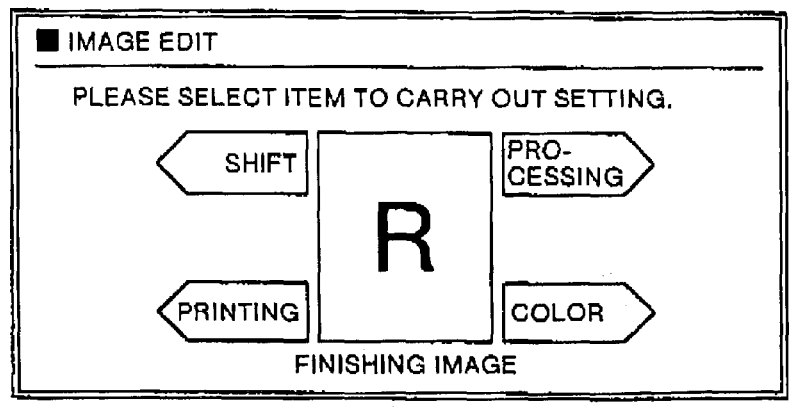
FIG. 3 is a diagram which shows a display example of an operation panel shown in FIG. 1.

FIG. 3 to FIG. 8 are diagrams which show a display example of the operation panel shown in FIG. 1. FIG. 3 is an image edit initial screen at the time of starting image editing from the standby state, and for example, there is only a read character "R" on the image display, thereby it is seen that any image edit function is not set.

In order to make it easily possible to set the edit function from this image display, main edit items such as "shift", "processing", "printing" and "color" are displayed as touch keys, so that these touch keys become a gate for setting each edit function.

Figure 4A:
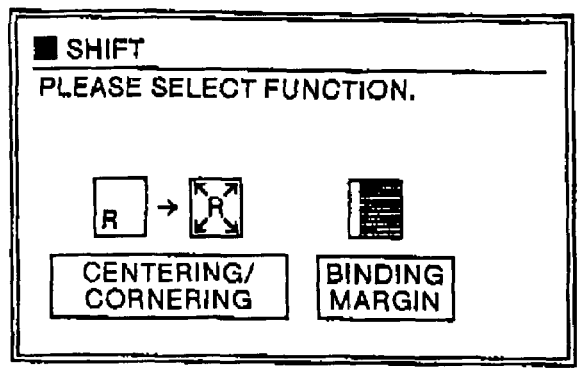
FIG. 4 is a diagram which shows a display example of the operation panel shown in FIG. 1.

When the touch key "shift" is pressed on the image edit initial screen shown in FIG. 3, the display shifts to a screen shown in FIG. 4A, where "binding margin", "centering" and "cornering", which are edit functions relating to image shift, can be set. When the touch key "processing" is pressed on the image edit initial screen shown in FIG. 3, the display shifts to a screen shown in FIG. 4B, where "delete center frame", "double copy", "repeat", "inversion", "mirror" and "combine", which are edit functions relating to image processing, can be set.

Figure 4B:
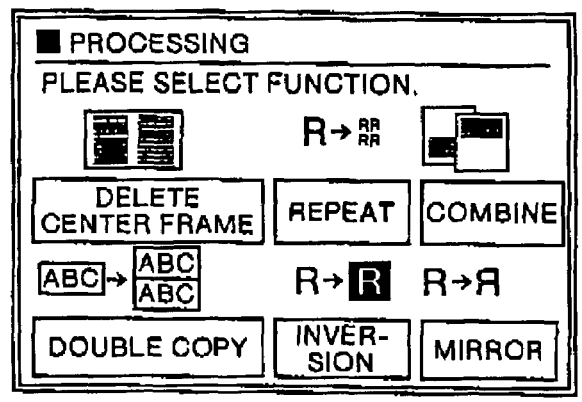
Figure 4C:
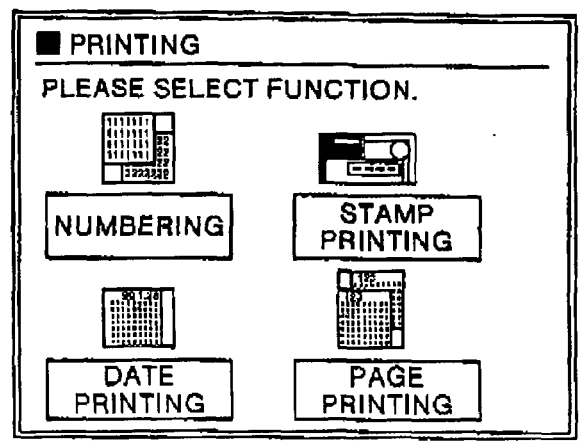

When the touch key "printing" is pressed on the image edit initial screen shown in FIG. 3, the display shifts to a screen shown in FIG. 4C, where "stamp printing", "numbering", "printing date" and "page printing", which are edit functions relating to printing, can be set.

Figure 4D:
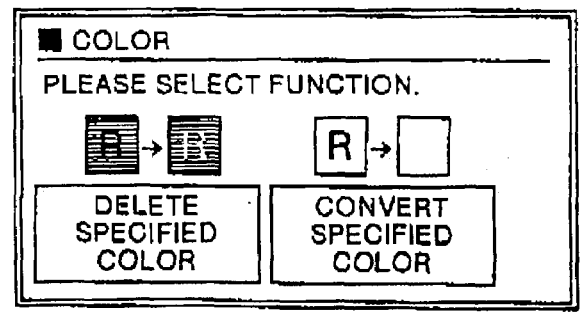

When the touch key "color" is pressed on the image edit initial screen shown in FIG. 3, the display shifts to a screen shown in FIG. 4D, where "delete specified color", "convert specified color" and the like, which are edit functions relating to the image color, can be set.

For example, when "stamp printing" and "repeat" are combined and set, the touch key "printing" is pressed on the image edit initial screen shown in FIG. 3, to shift to the screen in FIG. 4C. On the screen shown in FIG. 4C, the touch key "stamp printing" is pressed to set stamp printing.

Figure 5:
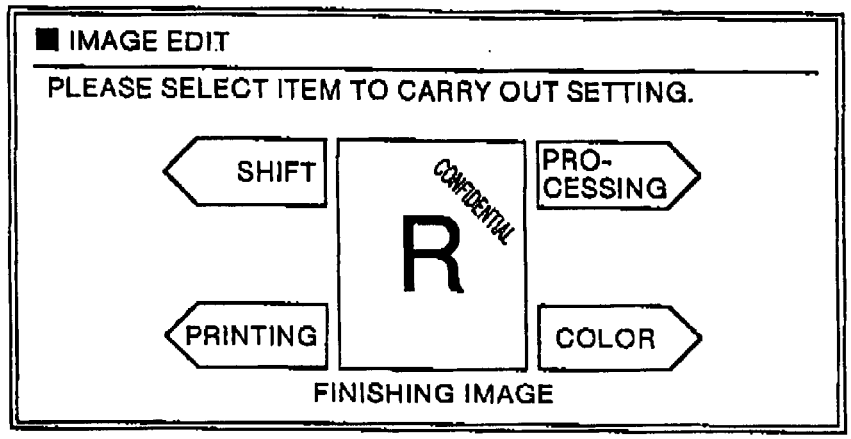
FIG. 5 is a diagram which shows a display example of the operation panel shown in FIG. 1.

As for the setting operation of stamp printing, it is a screen for setting the type of stamps, and the position and the direction of the stamp, as in the image processing device such as a conventional copying machine. After the setting, the display shifts to the image edit screen shown in FIG. 5 after having set stamp printing, not to the image edit initial screen. As shown in FIG. 5, the setting contents such as the type and the position of the stamp are reflected in the finishing image and displayed.

Figure 6:
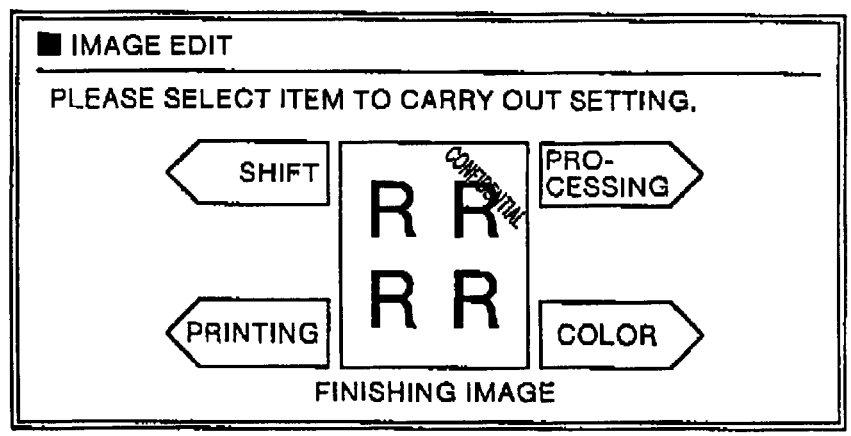
FIG. 6 is a diagram which shows a display example of the operation panel shown in FIG. 1.

The touch key "processing" is pressed in order to set "repeat", to thereby shift to the screen shown in FIG. 4B. On the screen shown in FIG. 4B, the touch key "repeat" is pressed, to set the repeat function. After the setting, the display shifts to the image edit screen shown in FIG. 6, which shows the screen after setting stamp printing and repeat. As shown in FIG. 6, the repeat function is reflected and displayed on the stamp-set image display.

Figure 7:
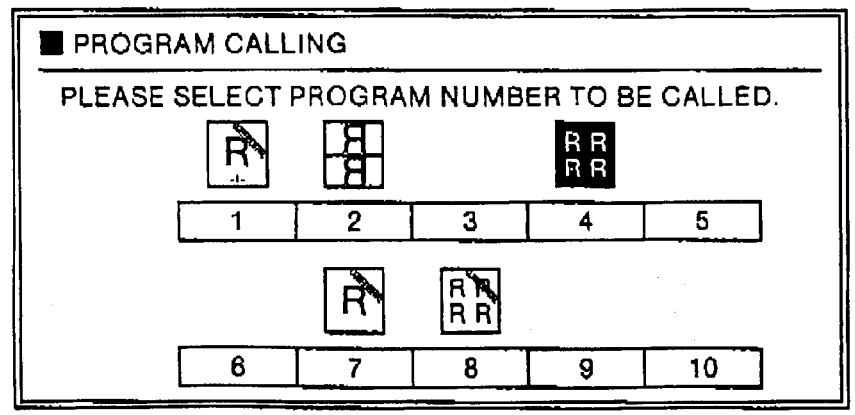
FIG. 7 is a diagram which shows a display example of the operation panel shown in FIG. 1.

On the other hand, when the image edit function is program registered, icon of a finishing image as shown in FIG. 7 is displayed for each program number, in a program registration list display after having called the program. By pressing the program number, which agrees with the imaged picture, the registered function can be called.

As one example of setting the edit function, when a stamp display section is touched on the image edit screen (FIG. 5) after having set stamp printing, or on the image edit screen (FIG. 6) after having set stamp printing+repeat, the display shifts to a stamp setting screen (FIG. 8) after having pressed the stamp printing display portion, or a stamp position specifying screen (FIG. 9). This screen is the same screen as that when the "stamp printing" key is pressed from the screen shown in FIG. 4C, and when setting of a specific function is changed or adjusted, operation having higher operability becomes possible.

In this screen, it is possible to select the type of the stamp, to set the position and direction of printing, and to set the printing page.

The edit function including the combination of stamp printing and repeat is not defined by the specification of the whole apparatus, but depends on the processing capability of the image processor of the apparatus, and in this embodiment, one example of the setting has been explained.

FIG. 10 is a flowchart which shows the control operation of the image processing device in this embodiment. After turning the power ON, a standby screen is generated and input of each key is monitored (step S101 to S103).

As for the input of the key, such a method is generally used that after button pressing information from the operation port has been obtained from the port information, it is detected which key input has been done, from the key information which is allocated to an address pre-defined in an RAM area as a flag.

For example, when the copy start key is pressed, if the apparatus is in a condition capable of copying, copying operation is carried out, and after having finished copying, the standby screen is again generated, to monitor the key input (step S104, YES, step S105, step S102 and step S103).

When the program calling key is pressed, a program calling screen is generated, to monitor the key input (step S106, YES, step S107 and step S108). When the program number key is pressed, the program is called (step S109, YES, step S110).

A function corresponding to the program number specified from the program registration area is called to carry out setting, and if the setting content is an image edit function, the display shifts to the image edit screen (step S112). When the edit key is pressed during monitoring the key input, the image edit screen is similarly generated (step S111, YES, step S112).

In this image edit screen generation, edit picture image display by the bitmap icon data, and display of the edit type keys and the operation guide are carried out based on the mode information and various parameter information.

After having generated the screen, monitoring of the key input is carried out, and then the program registration key and the edit function selection are judged (step S113). When the program registration key is pressed, program registration is carried out, the edit functions set heretofore are stored in the program registration area, and shifts to the key input monitoring screen again (step S114, YES, step S115, step S113).

When the edit function is newly set, the edit type key is pressed. When the edit function set before is reset or adjusted, by similarly pressing the edit type key, or by touching the edit function portion on the operation panel displayed as an edit picture image, setting of the edit function is carried out (step S116, YES, step S117).

In setting or adjusting the edit function, setting or canceling of the mode information corresponding to various edit functions and setting of various parameters required for the edit function are performed, for example, if setting of the edit function of stamp printing is to be carried out, the type of stamp, position, direction and printing page are set. By directly touching a modified portion on the edit screen touch panel, it is possible to set and adjust the edit function (step S118, YES, step S117).

As for the contents set and confirmed here, when the display shifts to the edit picture image display, the edit picture image display by the bitmap icon data is performed based on the mode information and the various parameter information, so that an edit picture image display that always reflects the newest setting contents is produced.

Even during setting of the edit function, the copying operation is executed by pressing the copy start key, which makes the copy start key effective as in the conventional copying machine (step S119, YES, step S120). After copying has been finished, if the operation is being continued, the screen returns to the standby screen generation (step S121, YES, step S102).

Figure 11:
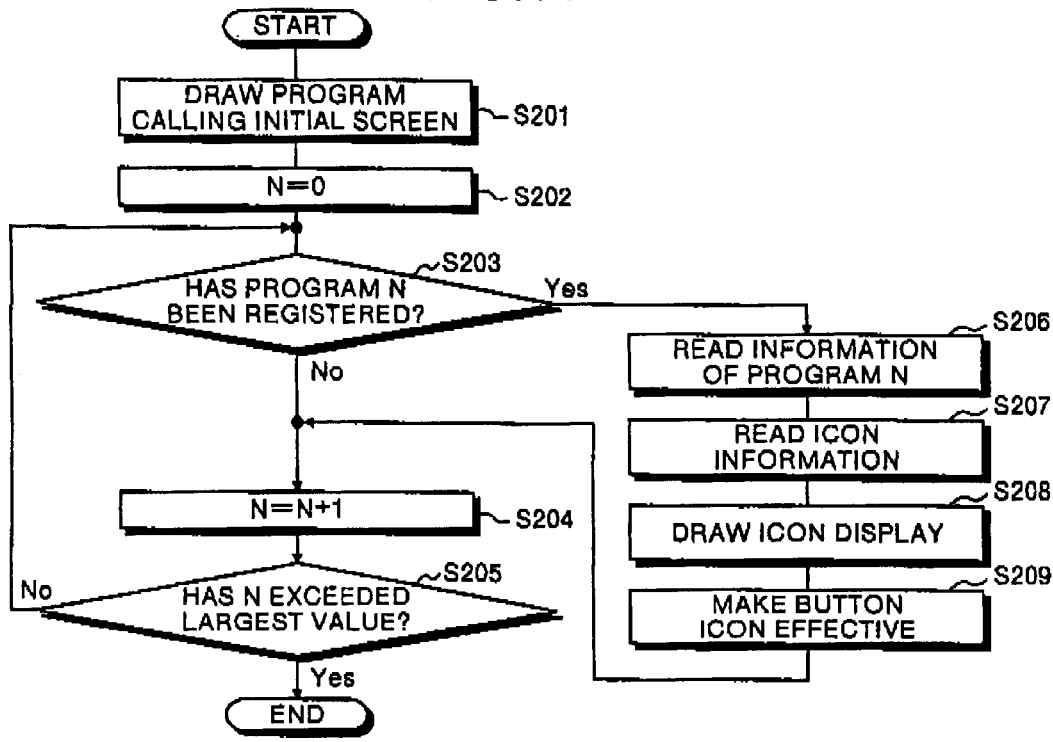
FIG. 11 is a flowchart which shows the operation of generating a program calling screen in the image processing device according to this embodiment.
Figure 12:
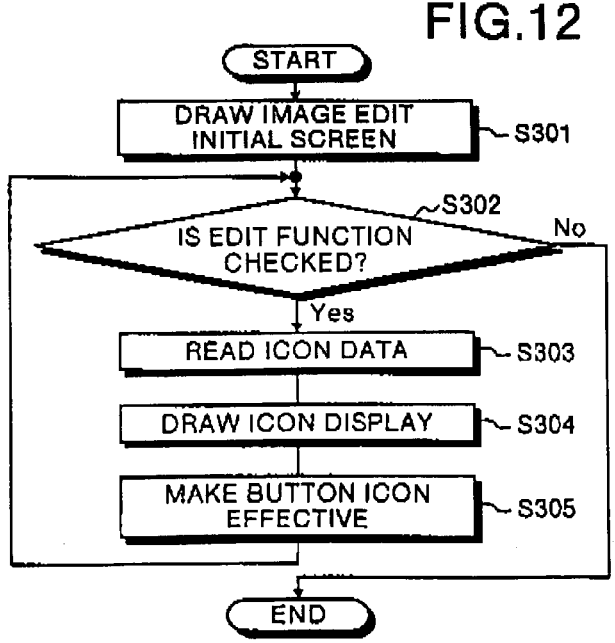
FIG. 12 is a flowchart which shows the operation of generating an image edit screen in the image processing device according to this embodiment.

FIG. 11 is a flowchart which shows the operation for generating the program calling screen in the image processing device in this embodiment. FIG. 12 is a flowchart which shows the operation for generating the image edit screen in the image processing device in this embodiment.

The control in the program calling screen generation module at step S107 in FIG. 10, that is, details of control for generating the screen shown in FIG. 7, will be explained with reference to FIG. 11.

When the program calling generation module is called, the program calling initial screen is drawn, and a window for building the screen and an explanatory note are drawn (step S201).

A variable N is initialized (=0), and it is checked whether there is a program registration, using the variable as a program number (step S202, step S203). If there is no registration in the target program number, processing for adding 1 to the variable N is carried out (step S203, NO, step S204).

The variable N after the processing is compared with the largest number of the program number, and if it is smaller than the largest number, it is again checked whether there is a program registration (step S205, NO, step S203).

If there is a program registration at this time, the program information is read from the program registration area (step S203, YES, step S206), and the corresponding icon data is selected and read from the bitmap (step S207), to thereby draw the icon display (step S208).

A button icon corresponding to the program number is effectively set so that the registered program number becomes an effective button (step S209).

The control in the image edit screen generation module at step S112 in FIG. 10, that is, details of the control of generating the screens in FIG. 3, FIG. 5 and FIG. 6 will be explained with reference to FIG. 12.

When the image edit screen generation module is called, the image edit initial screen is first drawn, and then a window for building the screen and an explanatory note are drawn (step S301).

It is checked if there is an edit function from the mode information and setting of parameters, and when the edit function has been set (step S302, YES), the corresponding icon data is read (step S303), and the icon display is drawn on the window (step S304).

The position of the coordinate axis on the operation panel where the icon is displayed is set as a button icon so that the position can be used as a gate to the edit setting function (step S305). When all edit functions have been checked, the image edit screen generation module is finished (step S302, NO).

As explained above, according to the image processing device in this embodiment, eve if complicated edit functions are combined, an operator can easily confirm an image of the output image obtained by completely finishing the setting of edit functions, before starting the image formation, thereby enabling reduction of copy errors and improvement of the work efficiency.

It is also easy to shift to the setting screen, by touching the portion which is desired to be changed on the displayed image. Even an operator who does not get used to the operation can easily set, thereby considerable reduction of working hours becomes possible, and the work efficiency can be improved.

The list of the program can be accessed not only by the numbers and names, but also as an imaged picture, and hence a third person can easily select a program which is desired to call, thereby enabling further improvement of the work efficiency.

Needless to say, the present invention is not limited to the above embodiment, and various modifications and substitution are possible within the scope of claims.

The present document incorporates by reference the entire contents of Japanese priority document, 2001-238976 filed in Japan on Aug. 7, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing device comprising:
   an image processing unit configured to convert a document image to digital information and to process and edit the digital information;
   an operation unit configured to combine and set a plurality of image edit functions with respect to the document image;
   a bitmap data memory configured to store a plurality of edit images; and
   a display unit configured to read out a picture image set by combining the plurality of image edit functions from the bitmap memory and to display the picture image before outputting the image processing result;
   an operation panel unit configured to detect a coordinate axis touched on the operation unit; and
   an editing unit configured to set an edit function corresponding to a location touched on the operation panel unit when some edit functions displayed as the picture image on the display unit is touched,
   wherein said bitmap data memory is configured to store a display icon which builds up the plurality of edit images as bitmap data, and when an address where the bitmap data is stored is specified, coordinates on said operation panel unit are also specified, and said icon is displayed on said operation panel unit.

2. The image processing device according to claim 1, further comprising:
   a program unit I/F configured to store and call the image edit functions set by the operation unit; and
   an operation unit I/F configured to display the edit images corresponding to the set image edit functions in a list,
   wherein when the image edit functions registered as a program are called, a content of the image edit functions is called from the edit images in which all the program-registered image edit setting contents are list-displayed.

3. The image processing device according to claim 1, wherein said display unit is configured to shift to an edit function setting when an image edit item selection key is selected, or when an edit function reflected as the edit image displayed on said operation panel unit is selected.

4. An image processing device comprising:
   an image processing unit configured to convert a document image to digital information and to process and edit the digital information;
   an operation unit configured to combine and set a plurality of image edit functions with respect to the document image;
   a bitmap data memory configured to store a plurality of edit images; and
   a display unit configured to read out a picture image set by combining the plurality of image edit functions from the bitmap memory and to display the picture image before outputting the image processing result;
   an operation panel unit configured to detect a coordinate axis touched on the operation panel unit; and
   an editing unit configured to set an edit function corresponding to a location touched on the operation unit when some edit functions displayed as the picture image on the display unit is touched,
   wherein said display unit is configured to shift to an edit function setting when an image edit item selection key is selected, or when an edit function reflected as the picture image displayed on said operation panel unit is selected,
   when said image edit item selection key is selected, a function is selected by a function selection process corresponding to the image edit item selection key, and the display shifts to an operation process in which setting of the selected function and a related adjustment are to be performed, and
   when an edit picture image display is touched, the display unit directly shifts to the operation process in which setting of the selected function and the related adjustment are to be performed.

5. The image processing device according to claim 4, wherein when the selected function and the related adjustment are finished, the display returns again to the edit picture image display, icons required for image display are taken out from said bitmap memory, according to the edit function set by the editing unit, and respective icons are confined to display one image on said operation panel unit.

* * * * *